(12) United States Patent
Freund et al.

(10) Patent No.: US 11,386,117 B2
(45) Date of Patent: Jul. 12, 2022

(54) SYNCHRONIZATION OF CUSTOMIZED TEMPLATES ACROSS MULTIPLE CLOUD-BASED SYSTEMS

(71) Applicant: SAP SE, Walldorf (DE)

(72) Inventors: Barbara Freund, Heidelberg (DE); Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 325 days.

(21) Appl. No.: 16/176,596

(22) Filed: Oct. 31, 2018

(65) Prior Publication Data

US 2020/0134080 A1 Apr. 30, 2020

(51) Int. Cl.
| | |
|---|---|
| *G06F 16/27* | (2019.01) |
| *H04L 67/1095* | (2022.01) |
| *G06F 16/22* | (2019.01) |
| *G06F 16/2455* | (2019.01) |
| *G06Q 30/00* | (2012.01) |

(52) U.S. Cl.
CPC .......... *G06F 16/27* (2019.01); *G06F 16/2282* (2019.01); *G06F 16/24565* (2019.01); *H04L 67/1095* (2013.01); *G06Q 30/01* (2013.01)

(58) Field of Classification Search
CPC ...... G06F 16/27; G06F 16/273; G06F 16/275; G06F 16/278; H04L 67/1095
USPC .......................................................... 707/624
See application file for complete search history.

(56) References Cited

U.S. PATENT DOCUMENTS

| | | | | |
|---|---|---|---|---|
| 2012/0077463 | A1* | 3/2012 | Robbins | H04W 60/00 455/411 |
| 2016/0072972 | A1* | 3/2016 | Akuzawa | H04N 1/00506 358/1.13 |
| 2016/0197773 | A1* | 7/2016 | Pandrangi | H04L 67/10 709/217 |
| 2019/0065542 | A1* | 2/2019 | Baker | G06F 16/273 |
| 2020/0084270 | A1* | 3/2020 | Ignatyev | G06Q 30/0635 |

\* cited by examiner

*Primary Examiner* — Vaishali Shah
(74) *Attorney, Agent, or Firm* — Mintz Levin Cohn Ferris Glovsky and Popeo, P.C.

(57) ABSTRACT

A method for synchronizing customized templates is provided. The method may include detecting a change to a first database table associated with a first cloud-based system hosting a first cloud-based software application. The change may correspond to customizations applied to a first template deployed at the first cloud-based system. The first template may define columns and/or rows in the first database table that is operated upon by the first cloud-based software application. The customizations applied to the first template may be identified based on the first database table. The customizations may be applied to a second template deployed at a second cloud-based system hosting a second cloud-based software application. The second template may define columns and/or rows in a second database table that is operated upon by the second cloud-based software application. Related systems and articles of manufacture, including computer program products, are also provided.

14 Claims, 6 Drawing Sheets

SYNCHRONIZATION OF CUSTOMIZED TEMPLATES ACROSS MULTIPLE CLOUD-BASED SYSTEMS

TECHNICAL FIELD

The present disclosure generally relates to cloud computing and, more specifically, to the synchronization of customized templates.

BACKGROUND

An application may be hosted by a cloud platform such that the application may be remotely accessible to multiple tenants, for example, over the Internet. For example, the application may be available as a cloud-based service including, for example, a software as a service (SaaS) and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, payroll, time and attendance management, recruiting and onboarding, learning and development, performance and compensation, workforce planning, and/or the like.

SUMMARY

Methods, systems, and articles of manufacture, including computer program products, are provided for synchronizing customized templates across multiple cloud-based systems. In one aspect, there is provided a system including at least one processor and at least one memory. The at least one memory can store instructions that cause operations when executed by the at least one processor. The operations may include: detecting a change to a first database table associated with a first cloud-based system hosting a first cloud-based software application, the change corresponding to one or more customizations applied to a first template deployed at the first cloud-based system, the first template defining one or more columns and/or rows in the first database table, and the first cloud-based software application operating on at least a portion of data in the first database table; responding to the change by at least identifying, based at least on the first database table, the one or more customizations that are applied to the first template; and applying, to a second template deployed at a second cloud-based system, the one or more customizations, the second cloud-based system hosting a second cloud-based software application, the second template defining one or more columns and/or rows in a second database table, and the second cloud-based software application operating on at least a portion of data in the second database table.

In some variations, one or more of the features disclosed herein including the following features can optionally be included in any feasible combination. The first template may correspond to the second template based at least on the first database table associated with the first template storing a same data and/or a same type of data as the second database table associated with the second template. The template that correspond to the first template may be determined to be absent from the second cloud-based system. In response to the absence of the template corresponding to the first template, the second template may be generated to include the one or more customizations applied to the first template.

In some variations, the one or more customizations may be specific to a tenant associated with the first cloud-based system and the second cloud-based system.

In some variations, the first template may define a first manner in which data is stored in the first database table by at least defining the one or more columns and/or rows in the first database table. The second template may define a second manner in which data is stored in the second database table by at least defining the one or more columns and/or rows in the second database table. The first template may be activated at the first cloud-based system to at least change the first manner in which data is stored in the first database table. The second template may be activated at the second cloud-based system to at least apply a same change to the second manner in which data is stored in the second database table.

In some variations, at least a portion of the data in the first database table may be transferred to the second cloud-based system to enable the identification of the one or more customizations to be performed at the second cloud-based system. The portion of the data that is transferred to the second cloud-based system may be held in a buffer at the second cloud-based system prior to being processed to identify the one or more customizations.

In some variations, the first database table may be associated with a database trigger configured to monitor the first database table for one or more changes. The change to the first database table may be detected based at least on an alert from the database trigger.

In some variations, the first template may be stored in a first database associated with the first cloud-based system. The second template may be stored in a second database associated with the second cloud-based system.

In another aspect, there is provided a method for synchronizing customized templates across multiple cloud-based systems. The method may include: detecting a change to a first database table associated with a first cloud-based system hosting a first cloud-based software application, the change corresponding to one or more customizations applied to a first template deployed at the first cloud-based system, the first template defining one or more columns and/or rows in the first database table, and the first cloud-based software application operating on at least a portion of data in the first database table; responding to the change by at least identifying, based at least on the first database table, the one or more customizations that are applied to the first template; and applying, to a second template deployed at a second cloud-based system, the one or more customizations, the second cloud-based system hosting a second cloud-based software application, the second template defining one or more columns and/or rows in a second database table, and the second cloud-based software application operating on at least a portion of data in the second database table.

In some variations, one or more of the features disclosed herein including the following features can optionally be included in any feasible combination. The first template may correspond to the second template based at least on the first database table associated with the first template storing a same data and/or a same type of data as the second database table associated with the second template. The template that correspond to the first template may be determined to be absent from the second cloud-based system. In response to the absence of the template corresponding to the first template, the second template may be generated to include the one or more customizations applied to the first template.

In some variations, the one or more customizations may be specific to a tenant associated with the first cloud-based system and the second cloud-based system.

In some variations, the first template may define a first manner in which data is stored in the first database table by at least defining the one or more columns and/or rows in the first database table. The second template may define a second manner in which data is stored in the second database table by at least defining the one or more columns and/or rows in the second database table. The first template may be activated at the first cloud-based system to at least change the first manner in which data is stored in the first database table. The second template may be activated at the second cloud-based system to at least apply a same change to the second manner in which data is stored in the second database table.

In some variations, at least a portion of the data in the first database table may be transferred to the second cloud-based system to enable the identification of the one or more customizations to be performed at the second cloud-based system. The portion of the data that is transferred to the second cloud-based system may be held in a buffer at the second cloud-based system prior to being processed to identify the one or more customizations.

In some variations, the first database table may be associated with a database trigger configured to monitor the first database table for one or more changes. The change to the first database table may be detected based at least on an alert from the database trigger.

In another aspect, there is provided a computer program product that includes a non-transitory computer readable medium. The non-transitory computer readable medium may store instructions that cause operations when executed by at least one data processor. The operations may include: detecting a change to a first database table associated with a first cloud-based system hosting a first cloud-based software application, the change corresponding to one or more customizations applied to a first template deployed at the first cloud-based system, the first template defining one or more columns and/or rows in the first database table, and the first cloud-based software application operating on at least a portion of data in the first database table; responding to the change by at least identifying, based at least on the first database table, the one or more customizations that are applied to the first template; and applying, to a second template deployed at a second cloud-based system, the one or more customizations, the second cloud-based system hosting a second cloud-based software application, the second template defining one or more columns and/or rows in a second database table, and the second cloud-based software application operating on at least a portion of data in the second database table.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the synchronization of customized templates, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

A cloud-based software application may operate on data stored in one or more database tables. As such, the cloud-based software application may be implemented based on a template defining the manner in which data is stored in the database tables. For example, the template may specify the columns that form the entries occupying the rows in each one of the database tables. In some example embodiments, the cloud-based software application may be delivered to different tenants with a set of default templates. Each tenant may subsequently select, based on individual requirements, one or more of the default templates. For instance, a tenant may select a default template specific to the tenant's industry. The tenant may further customize the cloud-based software application by applying, to the selected template, one or more tenant-specific customizations prior to deploying the customized template as part of that tenant's cloud-based system. Accordingly, each deployment of the cloud-based software application may be customized to operate on database tables storing data in a tenant-specific manner.

In some example embodiments, a single tenant may be associated with multiple cloud-based systems. Each cloud-based system may host a different cloud-based software application including, for example, an enterprise resource planning (ERP) software application, a customer relationship management (CRM) software application, and/or the like. Nevertheless, the different cloud-based software applications may operate on at least some common data such as, for example, billing plan data, order data, supply chain data, and/or the like. As such, the customizations that are applied to the templates deployed at one cloud-based system associated with the tenant may be propagated to the other cloud-based systems associated with the tenant. For example, the tenant may customize the template deployed at the cloud-based system hosting the enterprise resource planning software application. These tenant-specific customizations may include, for instance, modifications to the manner in which data is stored in a database table associated with the template. Moreover, these tenant-specific customizations may be propagated to the cloud-based system hosting the customer relationship management software application such that the same tenant-specific customizations are also applied to the corresponding templates deployed at the cloud-based system hosting the customer relationship management software application.

Figure 1:
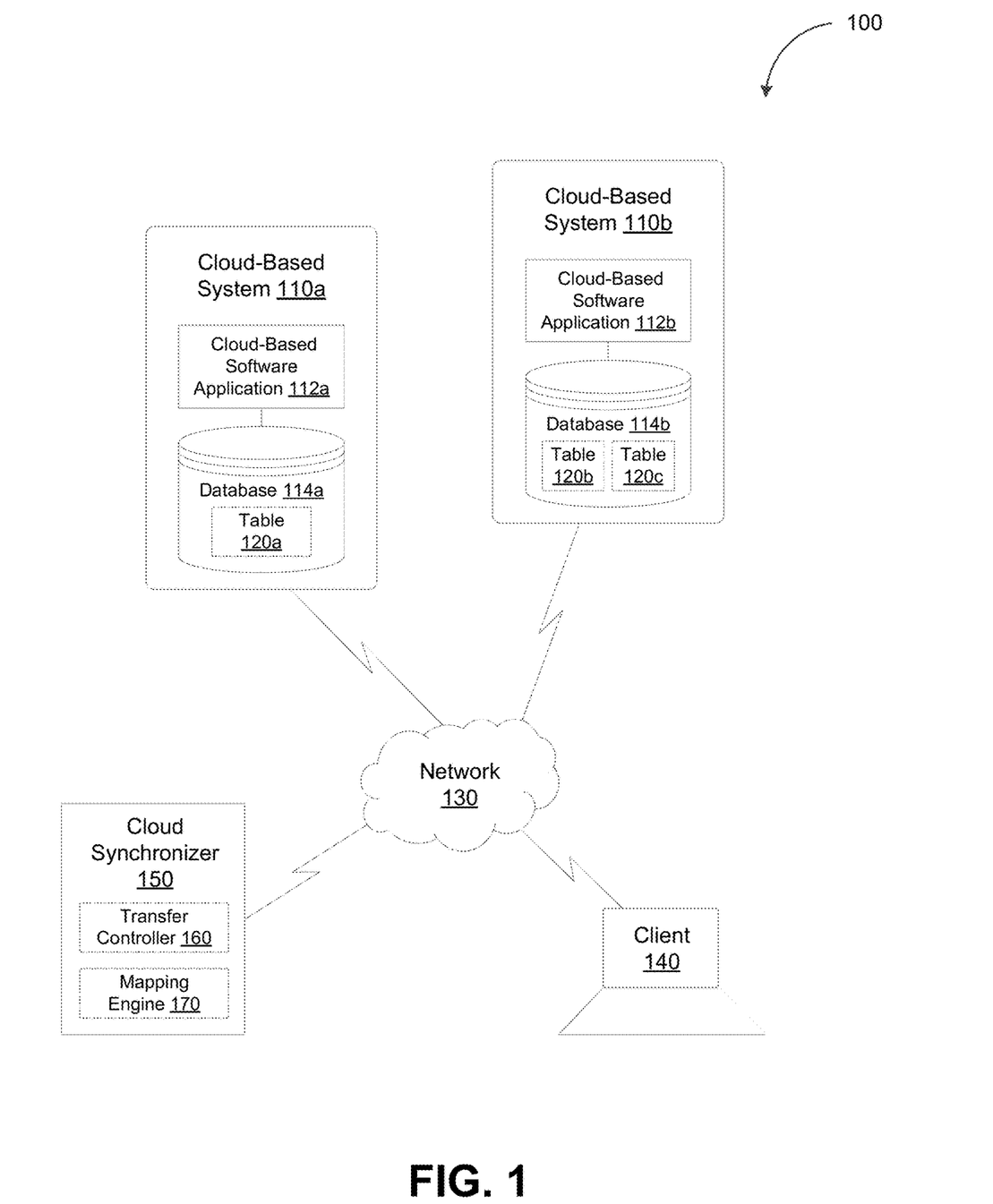
FIG. 1 depicts a system diagram illustrating a cloud synchronization system, in accordance with some example embodiments.

FIG. 1 depicts a system diagram illustrating a cloud synchronization system 100, in accordance with some example embodiments. Referring to FIG. 1, the cloud synchronization system 100 may include a first cloud-based system 110a, a second cloud-based system 110b, a client 140, and a cloud synchronizer 150. As shown in FIG. 1, the first cloud-based system 110a, the second cloud-based system 110b, the client 140, the cloud synchronizer 150 may be communicatively coupled via a network 130. It should be appreciated that the network 130 may be any wired and/or wireless network including, for example, a wide area network (WAN), local area network (LAN), a virtual local area network (VLAN), the Internet, and/or the like.

Referring again to FIG. 1, the first cloud-based system 110a may host a first cloud-based software application 112a while the second cloud-based system 110b may host a second cloud-based software application 112b. For instance, the first cloud-based software application 112a may be an enterprise resource planning (ERP) software application while the second cloud-based software application 112b may be a customer relationship management (CRM) software application. It should be appreciated that the first cloud-based based software application 112a and the second cloud-based software application 112b may be any cloud-based software application. For example, the first cloud-based based software application 112a and the second cloud-based software application 112b may be any cloud-based software application providing a variety of data processing functionalities including, for example, payroll, time and attendance management, recruiting and onboarding, learning and development, performance and compensation, workforce planning, and/or the like.

In some example embodiments, the first cloud-based software application 110a and/or the second cloud-based software application 110b may operate on data stored in one or more database tables. For example, the first cloud-based software application 110a and/or the second cloud-based software application 110b may store, retrieve, update, and/or delete data from one or more database tables. As such, the first cloud-based software application 110a and/or the second cloud-based software application 110b may be implemented based on templates that define the manner in which data is stored in the database tables.

To further illustrate, Table 1 below depicts pseudo programming code for a template defining the manner in which data is stored in a database table. In the example shown in Table 1, the template may include extensible markup language (XML) defining the manner in which data is stored in a database table.

TABLE 1

```
<item>
  <object_name> manufacturing method </object_name>
  <object_type> table_content</object_type>
  <table_name>tab_manufacuring</table_name>
  <field> method</field>
  <content>batch</content>
  <field>product</field>
  <content>medicine</content>
</item>
```

As shown in FIG. 1, the first cloud-based software application 110a may operate on data in a first table 120a stored in a first database 114a. The first cloud-based software application 110a may be implemented based on a template defining the manner in which data is stored in the first table 120a. For instance, the first cloud-based software application 110a may be implemented based on a template specifying the columns that form the entries occupying the rows in the first table 120a. Alternatively and/or additionally, the second cloud-based software application 110b may operate on data in a second table 120b and a third table 120c stored in a second database 114b. As such, the second cloud-based software application 110b may be implemented based on a template defining the manner in which data is stored in the second table 120b and the third table 120c including by specifying, for example, the columns that form the entries occupying the rows in the second table 120b and the third table 120c.

Figure 2A:
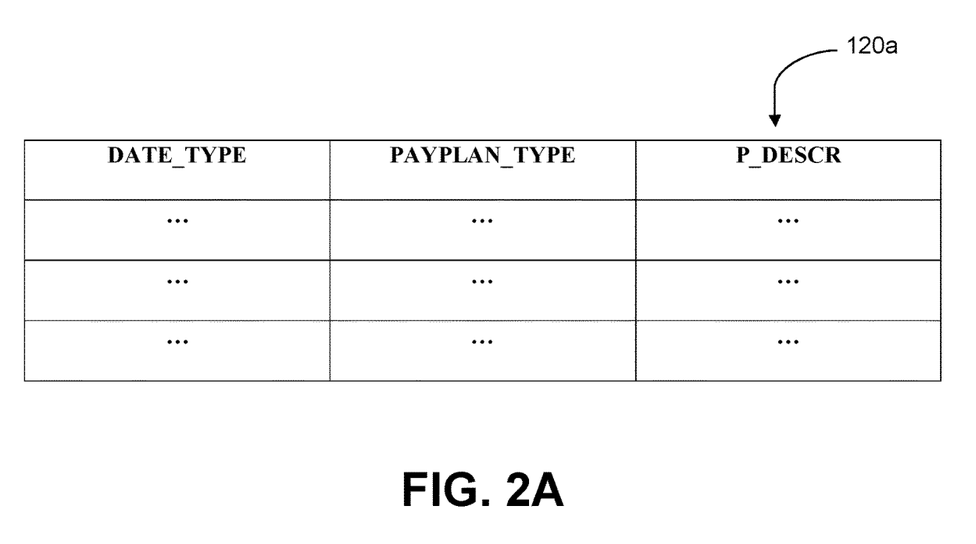
FIG. 2A depicts an example of a database table storing billing plan data, in accordance with some example embodiments.
Figure 2B:
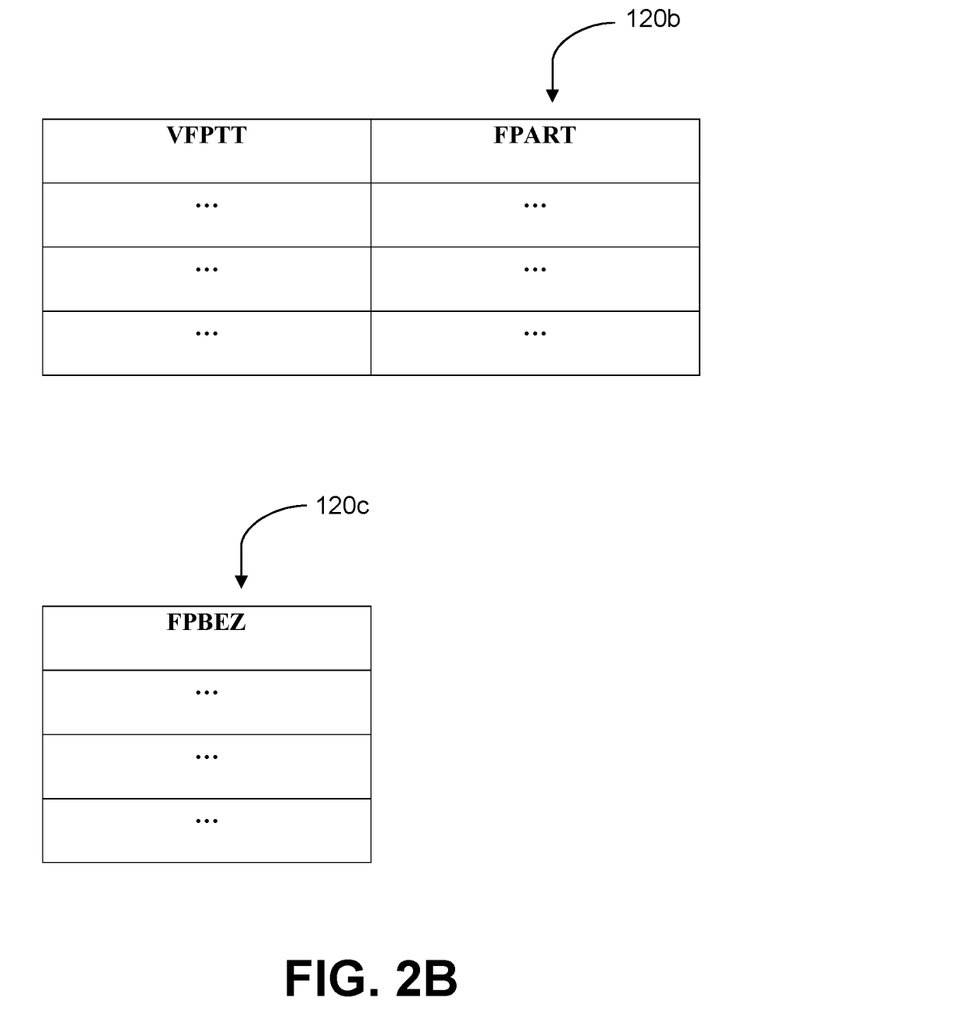
FIG. 2B depicts an example of database tables storing billing plan data, in accordance with some example embodiments.

To further illustrate, FIGS. 2A-B depict examples of database tables storing billing plan data, in accordance with some example embodiments. For example, FIG. 2A depicts the first table 120a, which may be a database table containing data that is operated upon by the first cloud-based software application 112a. Meanwhile, FIG. 2B depicts the second table 120b and the third table 120c, which may be database tables containing data that is operated upon by the second cloud-based application 112b.

As noted, the first cloud-based software application 112a may be an enterprise resource planning (ERP) software application while the second cloud-based application 112b may be a customer relationship management (CRM) software application. The first table 120a may store the billing plan data that is associated with the enterprise resource planning (ERP) software application whereas the second table 120b and the third table 120c may store billing plan data that is associated with the customer relationship management software application. As FIGS. 2A-B show, the first cloud-based system 110a may store billing data in a different manner than the second cloud-based system 110b. Accordingly, the first cloud-based software application 112a and the second cloud-based software application 112b may be implemented based on different templates defining the different manners in which data is stored at the first cloud-based system 110a (e.g., in the first table 120a) and at the second cloud-based system 110b (e.g., in the second table 120b and the third table 120c). Nevertheless, customizations that are applied to the template deployed at the first cloud-based system 110a may be propagated to the template that is deployed at the second cloud-based system 110b.

As shown in FIGS. 2A-B, the first table 120a, the second table 120b, and the third table 120c may include different columns. For instance, the first table 120a may include the columns DATE_TYPE, PAYPLAN_TYPE, and P_DESCR. Meanwhile, the second table 120b may include the columns VFPTT and FPART while the third table 120c may include the column FPBEZ. Although the columns in the first table 120a have different names than the columns in the second table 120b and the third table 120c, the columns in the first table 120a may be mapped to corresponding columns in the second table 120b and the third table 120c. For example, the column DATE_TYPE from the first table 120a may be mapped to the column VFPTT in the second table 120b and the column PAYPLAN_TYPE from the first table 120a may be mapped to the column FPART in the second table 120b. Furthermore, the column P_DESCR may be mapped to the column FPBEZ in the third table 120c. Accordingly, customizations that are applied to a template associated with the first table 120a may be propagated to a template associated with the second table 120b such that the first table 120a at the first cloud-based system 110a is synchronized with the second table 120b at the second cloud-based system 110b.

In some example embodiments, the cloud synchronizer 150 may include a transfer controller 160 and a mapping engine 170. Although FIG. 1 shows the transfer controller 160 and the mapping engine 170 as separate and/or remote from the first cloud-based system 110a and the second cloud-based system 110b, it should be appreciated that the transfer controller 160, the mapping engine 170, and/or instances thereof may be deployed locally at the first cloud-based system 110a and/or the second cloud-based system 110b.

The transfer controller 160 may be configured to detect changes applied to the first table 120a as a result of the client 140 deploying, at the first cloud-based system 110a, a customized template having one or more customizations that are specific to a tenant associated with the client 140. For example, the first table 120a may be associated with a database trigger configured to monitor the first table 120a for changes at the first table 120 including, for example, new data being written to the first table 120a. The database trigger may be further configured to alert the transfer controller 160 when changes occur at the first table 120a, thereby enabling the transfer controller 160 to detect when changes occur at the first table 120a.

In response to detecting the changes to the first table 120a, the transfer controller 160 may transfer, to the second cloud-based system 110b, at least a portion of the data from the first table 120a. For example, the data from the first table 120a may be transferred to the second cloud-based system 110b in an extensible markup language (XML) format and/or a different format. Moreover, the data from the first table 120a may be transferred to the second cloud-based system 110b using a web service communication protocol such as, for example, simple object access protocol (SOAP), representational state transfer (REST) protocol, and/or the like. For instance, the transfer controller 160 may transfer the data from the first table 120a by at least invoking, at the second cloud-based system 110b, an hypertext transfer protocol (HTTP) PUT method, a hypertext transfer protocol POST method, and/or the like.

In some example embodiments, the mapping engine 170 may identify, based at least on the data from the first table 120a that are being transferred to the second cloud-based system 110b, one or more tenant-specific customizations that have been applied to the template deployed at the first cloud-based system 110a. The one or more tenant-specific customizations may include any type of modifications to the template deployed at the first cloud-based system 110a. For example, the client 140 may have customized the template that is deployed at the first cloud-based system 110a to modify the data that is stored in accordance with the template including, for instance, an account type, an account statement version, a manufacturing method, and/or the like.

Alternatively and/or additionally, the client 140 may have customized the template deployed at the first cloud-based system 110a to modify the datatype of the data that is stored in DATE_TYPE column from the CHAR datatype to the DATE datatype and the datatype of the data that is stored in the P_DESCR column from the datatype MEDIUMTEXT to the datatype LONGTEXT. Accordingly, the mapping engine 170 may compare the data from the first table 120a against the template that is currently deployed at the second cloud-based system 110b to determine differences in the manner in which billing data is being stored in the first table 120a, the second table 120b, and/or the third table 120c.

Furthermore, the mapping engine 170 may apply the same customizations to a corresponding template that is deployed at the second cloud-based system 110b in order to synchronize the manner in which billing data is stored at the first cloud-based system 110a and the second cloud-based system 110b. If a corresponding template is not already deployed at the second cloud-based system 110b, the mapping engine 170 may store, at the second cloud-based system 110b, a new template having the same tenant-specific customizations as the template deployed at the first cloud-based system 110a. The mapping engine 170 may subsequently activate the template deployed at the first cloud-based system 110a and/or the template deployed at the second cloud-based system 110b. In doing so, the mapping engine 170 may ensure that datatypes of the data in the first table 120a storing billing data associated with the first cloud-based system 110a are consistent with the datatypes of the data in the second table 120b and the third table 120c storing billing data associated with the second cloud-based system 110b. For instance, by activating, at the second cloud-based system 110b, a template having the same tenant-specific modifications as the template deployed at the first cloud-based system 110a, the datatype of the data stored in the VFPTT column of the second table 120b may be changed to the datatype DATE and the datatype of the data that is stored in the FPBEZ column of the third table 120c may be changed to the datatype LONGTEXT.

Figure 3:
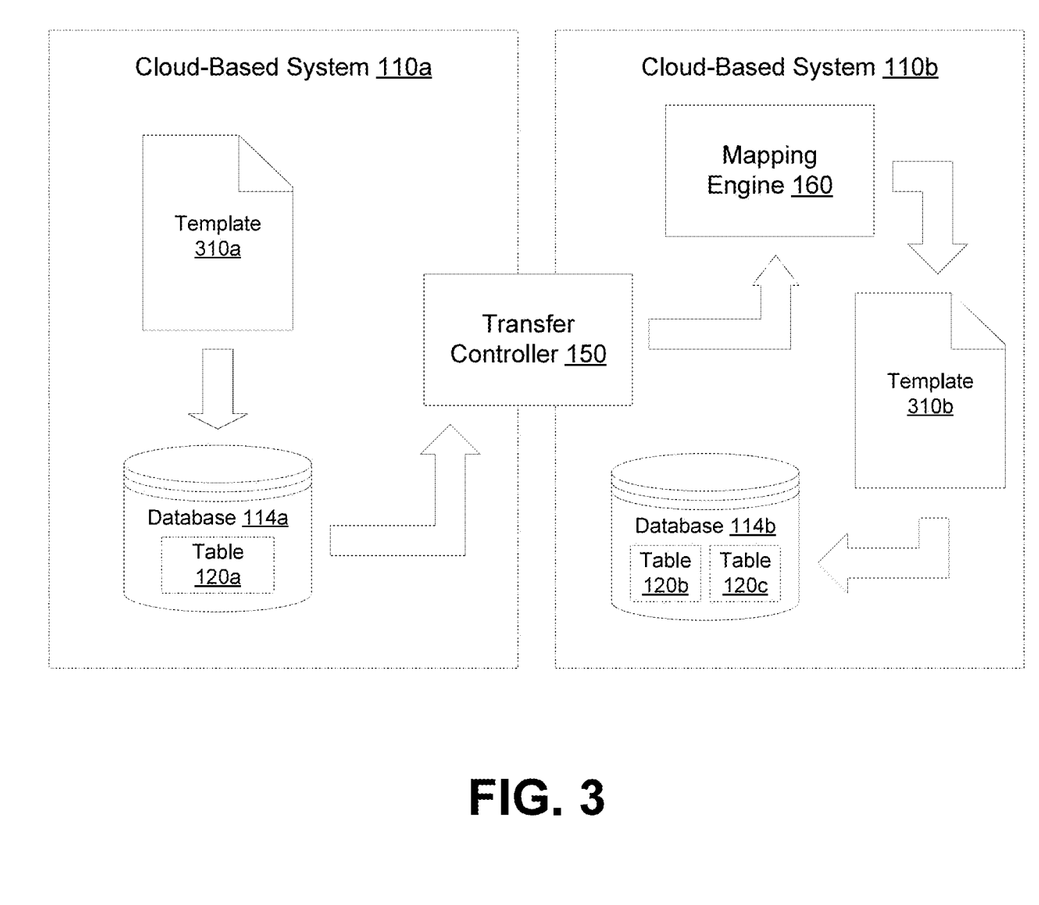
FIG. 3 depicts a block diagram illustrating the synchronization of a customized template across multiple cloud-based systems, in accordance with some example embodiments

FIG. 3 depicts a block diagram illustrating the synchronization of customized template across multiple cloud-based systems, in accordance with some example embodiments. Referring to FIGS. 1, 2A-B, and 3, a first template 310a may be deployed at the first cloud-based system 110a. The first template 310a may define the manner in which data is stored at the first database 114a associated with the first cloud-based system 110a including, for example, in the first table 120a. For example, the first template 310a may specify the columns (e.g., DATE_TYPE, PAYPLAN_TYPE, P_DESCR, and/or the like) that form the entries occupying the rows in the first table 120a. The first cloud-based software application 112a, which may be an enterprise resource planning (ERP) software application, may operate on data stored in the first table 120a. Accordingly, in some example embodiments, the client 140 may customize the first cloud-based software application 112a by at least applying, to the first template 310a, one or more tenant-specific customizations that modify, for example, the manner in which the data that is being operated upon by the first cloud-based software application 112a is stored in the first table 120a. For instance, the one or more tenant-specific customizations may include a change to the datatype of the data in the DATE_TYPE column and the P_DESCR column of the first table 120a. The first template 310a having the one or more tenant-specific modifications may be deployed at the first cloud-based system 110a to at least cause a change to the manner in which data is stored in the first table 120a.

The transfer controller 160 may be configured to detect changes at the first table 120a triggered, for example, by the client 140 deploying, at the first cloud-based system 110a, the first template 310a having one or more tenant-specific customizations. For example, a database trigger at the first database 114a may notify the transfer controller 160 to changes at the first table 120a including, for example, new data being written to the first table 120a. In response to detecting the changes to the first table 120a, the transfer controller 160 may transfer, to the second cloud-based system 110b, at least a portion of the data from the first table 120a. For instance, as noted, the transfer controller 160 may transfer the data from the first table 120a in an extensible markup language (XML) format and by invoking, at the second cloud-based system 110b, an hypertext transfer protocol (HTTP) PUT method, a hypertext transfer protocol POST method, and/or the like.

In some example embodiments, the mapping engine 170 may be configured to process the data from the first table 120a that the transfer controller 160 transfers from the first cloud-based system 110a to the second cloud-based system 110b. For example, the mapping engine 170 may process the data from the first table 120a to one or more tenant-specific customizations that have been applied to the first template 310a deployed at the first cloud-based system 110a. For example, the client 140 may have customized the first template 310a deployed at the first cloud-based system 110a to modify the datatype of the data that is stored in DATE_TYPE column from the CHAR datatype to the DATE datatype and the datatype of the data that is stored in the P_DESCR column from the datatype MEDIUMTEXT to the datatype LONGTEXT. While the mapping engine 170 processes the data from the first table 120a that is being transferred to the second cloud-based system 110b, the data from the first table 120a may be held in a buffer at the second cloud-based system 110b.

In some example embodiments, the mapping engine 170 may apply the same customizations to at the second cloud-based system 110b by at least generating and/or modifying a second template 310b that corresponds to the first template 310a. The mapping engine 170 may identify the second template 310 for applying the same customizations based at least on a correspondence between the first table 120a and the second template 310b. For example, the second template 310b may correspond to the first table 120a based on the second template 310b includes one or more tables (e.g., the second table 120b and the third table 120c) storing the same data as the first table 120a. In the event that the second template 310b is already deployed at the second cloud-based system 110b, the mapping engine 170 may apply, to the second template 310b, the same tenant-specific customizations that are applied to the first template 310a. Alternatively, if the second template 310b is not already deployed at the second cloud-based system 110b, the mapping engine 170 may generate the second template 310b to include the same tenant-specific customizations as the first template 310a.

For example, as noted, the client 140 may have customized the first template 310a deployed at the first cloud-based system 110a to modify the datatype of the data that is stored in DATE_TYPE column from the CHAR datatype to the DATE datatype and the datatype of the data that is stored in the P_DESCR column from the datatype MEDIUMTEXT to the datatype LONGTEXT. The mapping engine 170 may generate and/or update the second template 310b to include the same customizations. Furthermore, the mapping engine 170 may activate the first template 310a at the first cloud-based system 310a and/or the second template 310b at the second cloud-based system 110b such that the data that is stored in the first table 120a is consistent with the data that is stored in the second table 120b and the third table 120c. For instance, activating the first template 310a at the first cloud-based system 110a may change the datatypes of the data that is stored in the DATE_TYPE column and the P_DESCR column of the first table 120a. The datatype of the data stored in the DATA_TYPE column of the first table 120a may be changed to DATE while the datatype of the data stored in the P_DESCR column of the first table 120b may be changed to LONGTEXT. Alternatively and/or additionally, activating the second template 310b at the second cloud-based system 110b may also change the datatype of the data stored in the VFPTT column of the second table 120b to the datatype DATE and the datatype of the data that is stored in the FPBEZ column of the third table 120c to the datatype LONGTEXT.

Figure 4:
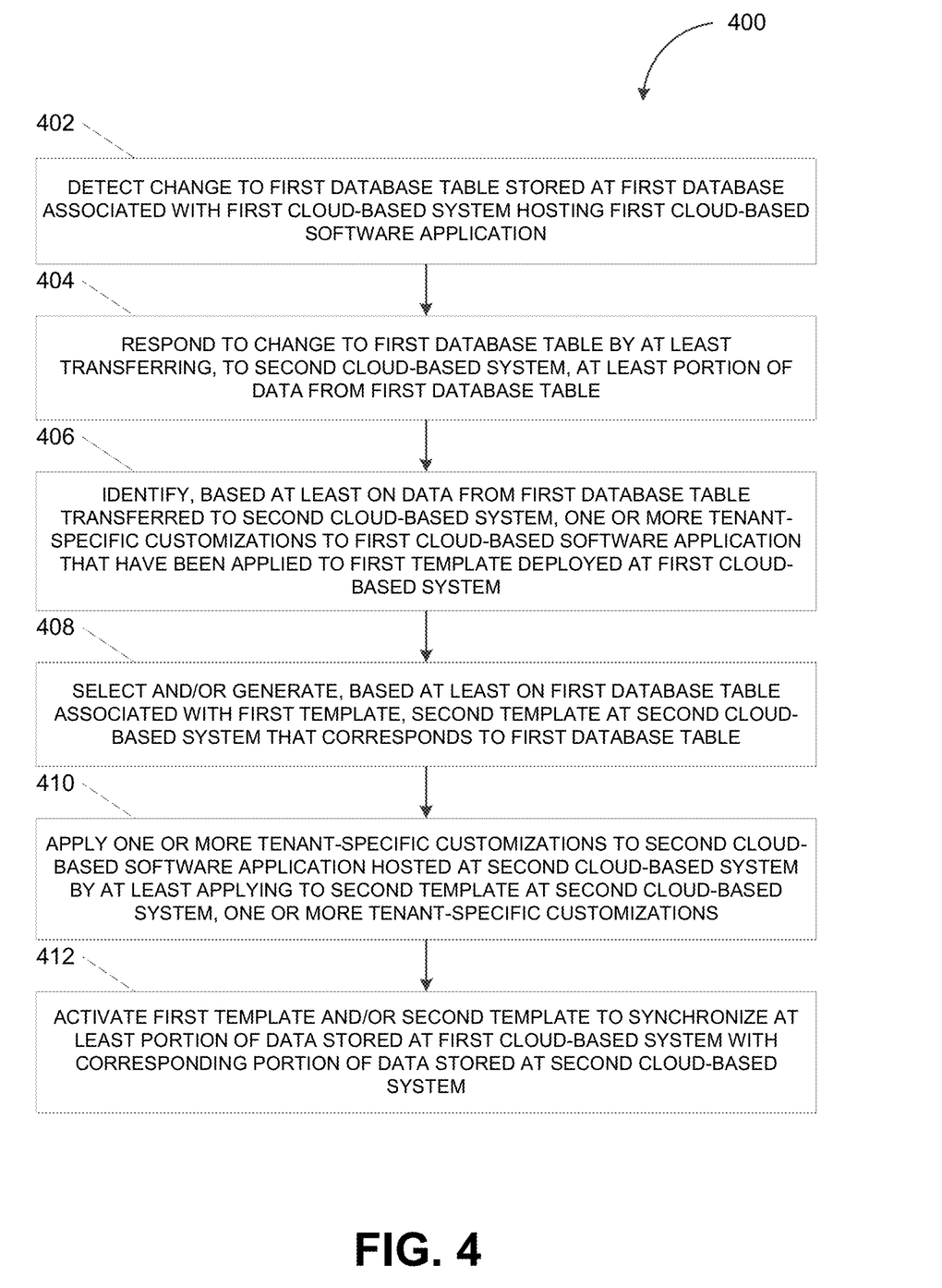
FIG. 4 depicts a flowchart illustrating a process for synchronizing a customized template, in accordance with some example embodiments.

FIG. 4 depicts a flowchart illustrating a process 400 for synchronizing a customized template, in accordance with some example embodiments. Referring to FIGS. 1, 2A-B, and 3-4, the process 400 may be performed by the cloud synchronizer 150, for example, by the transfer controller 160 or the mapping engine 170.

The cloud synchronizer 150 may detect a change to a first database table stored at a first database associated with the first cloud-based system 110a hosting the first cloud-based software application 112a (402). For example, the cloud synchronizer 150, for example, the transfer controller 160, may detect, based at least on an alert from a database trigger associated with the first table 120a stored in the first database 114a, one or more changes at the first table 120a including, for example, new data being written to the first table 120a. These changes may correspond to a change in the first template 310a deployed at the first cloud-based system 110a hosting the first cloud-based software application 112a.

As noted, the first template 310a may define the manner in which data is stored in the first table 120a including, for example, by specifying the columns (e.g., DATE_TYPE, PAYPLAN_TYPE, P_DESCR, and/or the like) that form the entries occupying the rows in the first table 120a. Meanwhile, the first cloud-based software application 112a, which may be an enterprise resource management (ERM) software application, may operate on the data stored in the first table 120a including by, for example, storing, updating, deleting, and/or retrieving data from the first table 120a. Accordingly, changing the first template 310a, for example, by applying one or more customizations specific to the tenant associated with the client 140, may alter the manner in which data is stored in the first table 120a. Moreover, by applying the tenant-specific customizations to the first template 310a, the client 140 may customize the first cloud-based software application 112*a* by at least customizing the data that is being operated upon by the first cloud-based software application 112*a*.

The cloud synchronizer 150 may respond to the change to the first database table by at least transferring, to the second cloud-based system 110*b*, at least a portion of the data from the first database table (404). In some example embodiments, the cloud synchronizer 150, for example, the transfer controller 160, may transfer, to the second cloud-based system 110*b*, at least a portion of the data from the first table 120*a* in response to the changes detected at the first table 120*a*. For example, the data from the first table 120*a* may be transferred to the second cloud-based system 110*b* in an extensible markup language (XML) format and/or a different format. Moreover, the cloud synchronizer 150 may use a web service communication protocol such as, for example, simple object access protocol (SOAP), representational state transfer (REST) protocol, and/or the like, to transfer the data from the first table 120*a* from the first cloud-based system 110*a* to the second cloud-based system 110*b*. For instance, the data from the first table 120*a* may be transferred by at least invoking, at the second cloud-based system 110*b*, an hypertext transfer protocol (HTTP) PUT method, a hypertext transfer protocol POST method, and/or the like.

The cloud synchronizer 150 may identify, based at least on the data from the first database table transferred to the second cloud-based system 110*b*, one or more tenant-specific customizations to the first cloud-based software application 112*a* that have been applied to a first template deployed at the first cloud-based system 110*a* (406). For example, the cloud synchronizer 150, for example, the mapping engine 170, may identify, based at least on the data from the first table 120*a* that are being transferred to the second cloud-based system 110*b*, one or more tenant-specific customizations that have been applied to the first template 310*a* deployed at the first cloud-based system 110*a*. These tenant-specific customizations may include, for instances, changes to the datatype of the data that is stored in DATE_TYPE column of the first table 120*a* (e.g., from the CHAR datatype to the DATE datatype) and changes to the datatype of the data that is stored in the P_DESCR column of the first table 120*a* (e.g., from the datatype MEDIUMTEXT to the datatype LONGTEXT). Accordingly, the cloud synchronizer 150 may compare the data from the first table 120*a* against the second template 310*b* that is currently deployed at the second cloud-based system 110*b* to determine the differences in the manner in which data is being stored in the first table 120*a* at the first cloud-based system 110*a* relative to the manner in which data is being stored in the second table 120*b* and/or the third table 120*c* at the second cloud-based system 110*b*.

The cloud synchronizer 150 may select and/or generate, based at least on the first database table associated with the first template, a second template at the second cloud-based system 110*b* that corresponds to the first database table (408). For example, the mapping engine 170 at the cloud synchronizer 150 may select the second template 310*b* at the second cloud-based system 110*b* based on a correspondence between the first table 120*a* and the second template 310*b*. The second template 310*b* may correspond to the first table 120*a* based on the second template 310*b* being associated with the second table 120*b* and the third table 120*c*, which store the same data as the first table 120*a*. Alternatively, if the second template 310*b* corresponding to the first table 120*a* is not already present at the second cloud-based system 110*b*, the mapping engine 170 may generate, at the second cloud-based system 110*b*, the second template 310*b* corresponding to the first table 120*a*.

The cloud synchronizer 150 may apply the one or more tenant specific customizations to the second cloud-based software application 112*b* hosted at the second cloud-based system 110*b* by at least applying the one or more tenant specific customizations to the second template at the second cloud-based system 110*b* (410). In some example embodiments, the cloud synchronizer 150, for example, the mapping engine 170 may apply, to the second template 310*b* at the second cloud-based system 110*b*, the same customizations that are applied to the first template 310*a* deployed at the first cloud-based system 110*a*.

The cloud synchronizer 150 may activate the first template and/or the second template to synchronize at least a portion of the data stored at the first cloud-based system 110*a* with a corresponding portion of data stored at the second cloud-based system 110*b* (412). The mapping engine 170 may activate the first template 310*a* at the first cloud-based system 110*a* and/or the second template 310*b* at the second cloud-based system 110*b*. In doing so, the mapping engine 170 may ensure that the data in the first table 120*a* are consistent with the data in the second table 120*b* and the third table 120*c*. For example, activating the first template 310*a* at the first cloud-based system 110*a* may change the datatypes of the data that is stored in the DATE_TYPE column and the P_DESCR of the first table 120*a*. Meanwhile, by activating, at the second cloud-based system 110*b*, the second template 310*b* having the same tenant-specific modifications as the first template 310*a* deployed at the first cloud-based system 110*a*, the same changes may be applied to the datatype of the data stored in the VFPTT column of the second table 120*b* and the datatype of the data that is stored in the FPBEZ column of the third table 120*c*.

Figure 5:
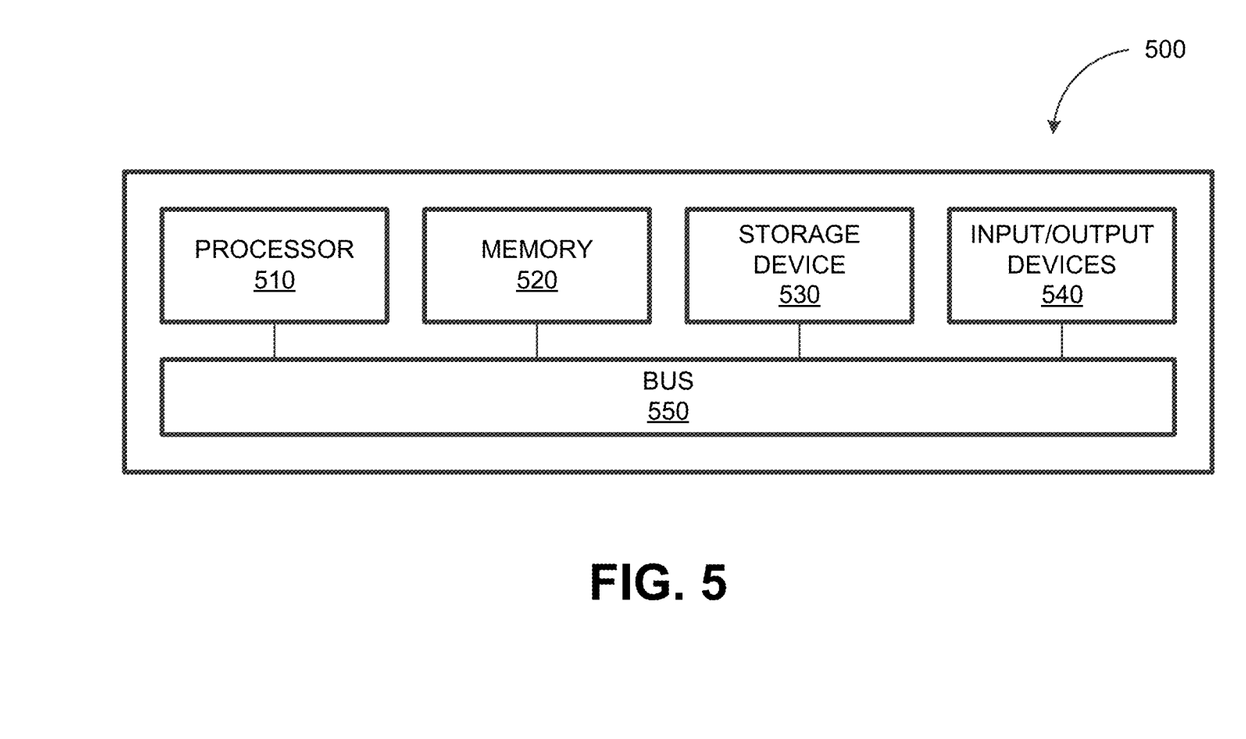
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the cloud synchronizer 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the cloud synchronizer 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   detecting a change to a first database table associated with a first cloud-based system hosting a first cloud-based software application, the change corresponding to one or more customizations applied to a first template deployed at the first cloud-based system, the one or more customizations being tenant-specific customizations associated with a tenant of the first cloud-based system, the first template defining a first manner in which data is stored in the first database table by at least defining a first plurality of columns comprising a first plurality of rows in the first database table, and the first cloud-based software application operating, based at least on the first template, on at least a portion of data in the first database table;
responding to the change by at least identifying, based at least on the first database table, the one or more customizations that are applied to the first template;
selecting a second template corresponding to the first database table, the second template defining a second manner in which data is stored in the second database table by at least defining a second plurality of columns comprising a second plurality of rows in the second database table, the second template being selected based at least on a mapping between a first column of the first database table and a second column of the second database table indicating that the first column of the first database table stores a same data as the second column of the second database table, the second database table being operated upon by a second cloud-based software application hosted at a second cloud-based system that is associated with the tenant of the first cloud-based system, the second template being different from the first template wherein the second database table defined by the second template includes at least one different column than the first database table; and
applying, to the second template, the one or more customizations wherein the same data occupying the first column of the first database table and the second column of the second database table are stored in a same manner at the first cloud-based system and the second cloud-based system.

2. The system of claim 1, wherein the one or more customizations applied to the first template and the second template include changing a datatype of the same data occupying the first column of the first database table and the second column of the second database table.

3. The system of claim 1, further comprising:
determining that the second template corresponding to the first database table is absent from the second cloud-based system; and
in response to the absence of the second template, generating the second template to include the one or more customizations applied to the first template.

4. The system of claim 1, further comprising:
activating, at the first cloud-based system, the first template to at least apply the change to the first manner in which data is stored in the first database table; and
activating, at the second cloud-based system, the second template to at least apply the change to the second manner in which data is stored in the second database table.

5. The system of claim 1, wherein the portion of the data that is transferred to the second cloud-based system is held in a buffer at the second cloud-based system prior to being processed to identify the one or more customizations.

6. The system of claim 1, wherein the first database table is associated with a database trigger configured to monitor the first database table for one or more changes, and wherein the change to the first database table is detected based at least on an alert from the database trigger.

7. The system of claim 1, wherein the first template is stored in a first database associated with the first cloud-based system, and wherein the second template is stored in a second database associated with the second cloud-based system.

8. A method, comprising:
detecting a change to a first database table associated with a first cloud-based system hosting a first cloud-based software application, the change corresponding to one or more customizations applied to a first template deployed at the first cloud-based system, the one or more customizations being tenant-specific customizations associated with a tenant of the first cloud-based system, the first template defining a first manner in which data is stored in the first database table by at least defining a first plurality of columns comprising a first plurality of rows in the first database table, and the first cloud-based software application operating, based at least on the first template, on at least a portion of data in the first database table;
responding to the change by at least identifying, based at least on the first database table, the one or more customizations that are applied to the first template;
selecting a second template corresponding to the first database table, the second template defining a second manner in which data is stored in the second database table by at least defining a second plurality of columns comprising a second plurality of rows in the second database table, the second template being selected based at least on a mapping between a first column of the first database table and a second column of the second database table indicating that the first column of the first database table stores a same data as the second column of the second database table, the second database table being operated upon by a second cloud-based software application hosted at a second cloud-based system that is associated with the tenant of the first cloud-based system, the second template being different from the first template wherein the second database table defined by the second template includes at least one different column than the first database table; and
applying, to the second template, the one or more customizations wherein the same data occupying the first column of the first database table and the second column of the second database table are stored in a same manner at the first cloud-based system and the second cloud-based system.

9. The method of claim 8, wherein the one or more customizations applied to the first template and the second template include changing a datatype of the same data occupying the first column of the first database table and the second column of the second database table.

10. The method of claim 8, further comprising:
determining that the second template corresponding to the first database table is absent from the second cloud-based system; and
in response to the absence of the second template, generating the second template to include the one or more customizations applied to the first template.

11. The method of claim 8, further comprising:
activating, at the first cloud-based system, the first template to at least apply a change to the first manner in which data is stored in the first database table; and
activating, at the second cloud-based system, the second template to at least apply the change to the second manner in which data is stored in the second database table.

12. The method of claim 8, wherein the portion of the data that is transferred to the second cloud-based system is held in a buffer at the second cloud-based system prior to being processed to identify the one or more customizations.

13. The method of claim 8, wherein the first database table is associated with a database trigger configured to monitor the first database table for one or more changes, and wherein the change to the first database table is detected based at least on an alert from the database trigger.

14. A non-transitory computer readable medium storing instructions, which when executed by at least one data processor, result in operations comprising:

detecting a change to a first database table associated with a first cloud-based system hosting a first cloud-based software application, the change corresponding to one or more customizations applied to a first template deployed at the first cloud-based system, the one or more customizations being tenant-specific customizations associated with a tenant of the first cloud-based system, the first template defining a first manner in which data is stored in the first database table by at least defining a first plurality of columns comprising a first plurality of rows in the first database table, and the first cloud-based software application operating, based at least on the first template, on at least a portion of data in the first database table;

responding to the change by at least identifying, based at least on the first database table, the one or more customizations that are applied to the first template;

selecting a second template corresponding to the first database table, the second template defining a second manner in which data is stored in the second database table by at least defining a second plurality of columns comprising a second plurality of rows in the second database table, the second template being selected based at least on a mapping between a first column of the first database table and a second column of the second database table indicating that the first column of the first database table stores a same data as the second column of the second database table, the second database table being operated upon by a second cloud-based software application hosted at a second cloud-based system that is associated with the tenant of the first cloud-based system, the second template being different from the first template wherein the second database table defined by the second template includes at least one different column than the first database table; and applying, to the second template, the one or more customizations wherein the same data occupying the first column of the first database table and the second column of the second database table are stored in a same manner at the first cloud-based system and the second cloud-based system.

* * * * *